US011533271B2

(12) United States Patent
Bernat et al.

(10) Patent No.: US 11,533,271 B2
(45) Date of Patent: Dec. 20, 2022

(54) TECHNOLOGIES FOR FLEXIBLE AND AUTOMATIC MAPPING OF DISAGGREGATED NETWORK COMMUNICATION RESOURCES

(71) Applicant: Intel Corporation, Santa Clara, CA (US)

(72) Inventors: Francesc Guim Bernat, Barcelona (ES); Antonino Albarran, Madrid (ES); Jaime Sanz, Madrid (ES); Raghu R. Kondapalli, San Jose, CA (US); Alexander Bachmutsky, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 840 days.

(21) Appl. No.: 15/720,256

(22) Filed: Sep. 29, 2017

(65) Prior Publication Data

US 2019/0104083 A1   Apr. 4, 2019

(51) Int. Cl.
| G06F 15/16 | (2006.01) |
| H04L 47/783 | (2022.01) |
| H04L 47/70 | (2022.01) |
| H04L 47/762 | (2022.01) |
| H04L 41/5019 | (2022.01) |
| H04L 41/5009 | (2022.01) |
| H04L 43/0876 | (2022.01) |
| H04L 43/16 | (2022.01) |
| H04L 47/72 | (2022.01) |

(52) U.S. Cl.
CPC ........ *H04L 47/783* (2013.01); *H04L 41/5009* (2013.01); *H04L 41/5019* (2013.01); *H04L 47/762* (2013.01); *H04L 47/821* (2013.01); *H04L 43/0876* (2013.01); *H04L 43/16* (2013.01); *H04L 47/72* (2013.01)

(58) Field of Classification Search
CPC .............. H04L 47/783; H04L 41/5019; H04L 41/5009; H04L 47/821; H04L 47/762; H04L 43/0876; H04L 43/16; H04L 47/72
See application file for complete search history.

(56) References Cited

U.S. PATENT DOCUMENTS

| 7,145,898 B1 * | 12/2006 | Elliott | ..................... H04L 12/66 370/352 |
| 7,398,380 B1 * | 7/2008 | Lovett | ................... G06F 15/177 712/15 |

(Continued)

*Primary Examiner* — Hieu T Hoang
(74) *Attorney, Agent, or Firm* — Compass IP Law PC (57) ABSTRACT

Technologies for dynamic allocation of network communication resources includes a resource manager server to allocate a set of network communication resources to a compute device through an expansion bus switch that is coupled to the compute device and to the network communication resources. The resource manager server obtains telemetry data indicative of a present utilization of the allocated set of network communication resources and determines whether the present utilization satisfies a predefined utilization threshold. Additionally, the resource manager server adjusts, through the expansion bus switch and in response to a determination that the present utilization does not satisfy the predefined utilization threshold, an amount of network communication resources in the set to the compute device.

34 Claims, 6 Drawing Sheets

(56) References Cited

U.S. PATENT DOCUMENTS

| | | | |
|---|---|---|---|
| 7,937,447 B1* | 5/2011 | Cohen | H04L 41/04 709/212 |
| 9,838,341 B1* | 12/2017 | Kadosh | H04L 49/9005 |
| 2005/0125537 A1* | 6/2005 | Martins | G06F 9/5083 709/226 |
| 2006/0029097 A1* | 2/2006 | McGee | H04L 47/125 370/468 |
| 2010/0088456 A1* | 4/2010 | Chu | G06F 13/4022 710/316 |
| 2010/0115174 A1* | 5/2010 | Akyol | G06F 13/385 710/316 |
| 2010/0115509 A1* | 5/2010 | Kern | G06F 9/5094 718/1 |
| 2014/0373010 A1* | 12/2014 | Folco | G06F 9/45533 718/1 |
| 2015/0207678 A1* | 7/2015 | Li | G06F 9/45558 370/254 |
| 2015/0288588 A1* | 10/2015 | de Souza | G06F 1/3209 709/224 |
| 2016/0077948 A1* | 3/2016 | Goel | G06F 11/328 714/47.1 |
| 2016/0197880 A1* | 7/2016 | Korman | H04L 41/0896 709/226 |
| 2016/0261617 A1* | 9/2016 | Chen | G06F 21/85 |
| 2016/0328344 A1* | 11/2016 | Jose | G06F 13/4022 |
| 2016/0335209 A1* | 11/2016 | Jau | G06F 13/36 |
| 2017/0010907 A1* | 1/2017 | Challa | G06F 9/45558 |
| 2017/0289068 A1* | 10/2017 | Palermo | H04L 49/9047 |
| 2018/0357109 A1* | 12/2018 | Mithal | G06F 9/5005 |
| 2020/0012508 A1* | 1/2020 | Mahloo | G06F 11/3055 |

* cited by examiner

TECHNOLOGIES FOR FLEXIBLE AND AUTOMATIC MAPPING OF DISAGGREGATED NETWORK COMMUNICATION RESOURCES

BACKGROUND

Current implementations of network communication resources, such as network interface controllers (NICs), in data centers are statically mapped to compute devices. That is, an orchestrator allocates a certain amount of NICs to a compute device to perform a workload (e.g., applications, processes, etc.) based on the workload requirements.

The implementation of the NICs among the compute devices described above leads to difficulty in balancing the workload in the processors based on the amount of network capacity because of issues with network density, bandwidth capacity of the NICs, and heterogeneity of the available NICs. As such, some of the NICS allocated to perform the workload may become saturated or underutilized since these NICS are allocated to a particular compute device for performing a workload that may vary in bandwidth.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
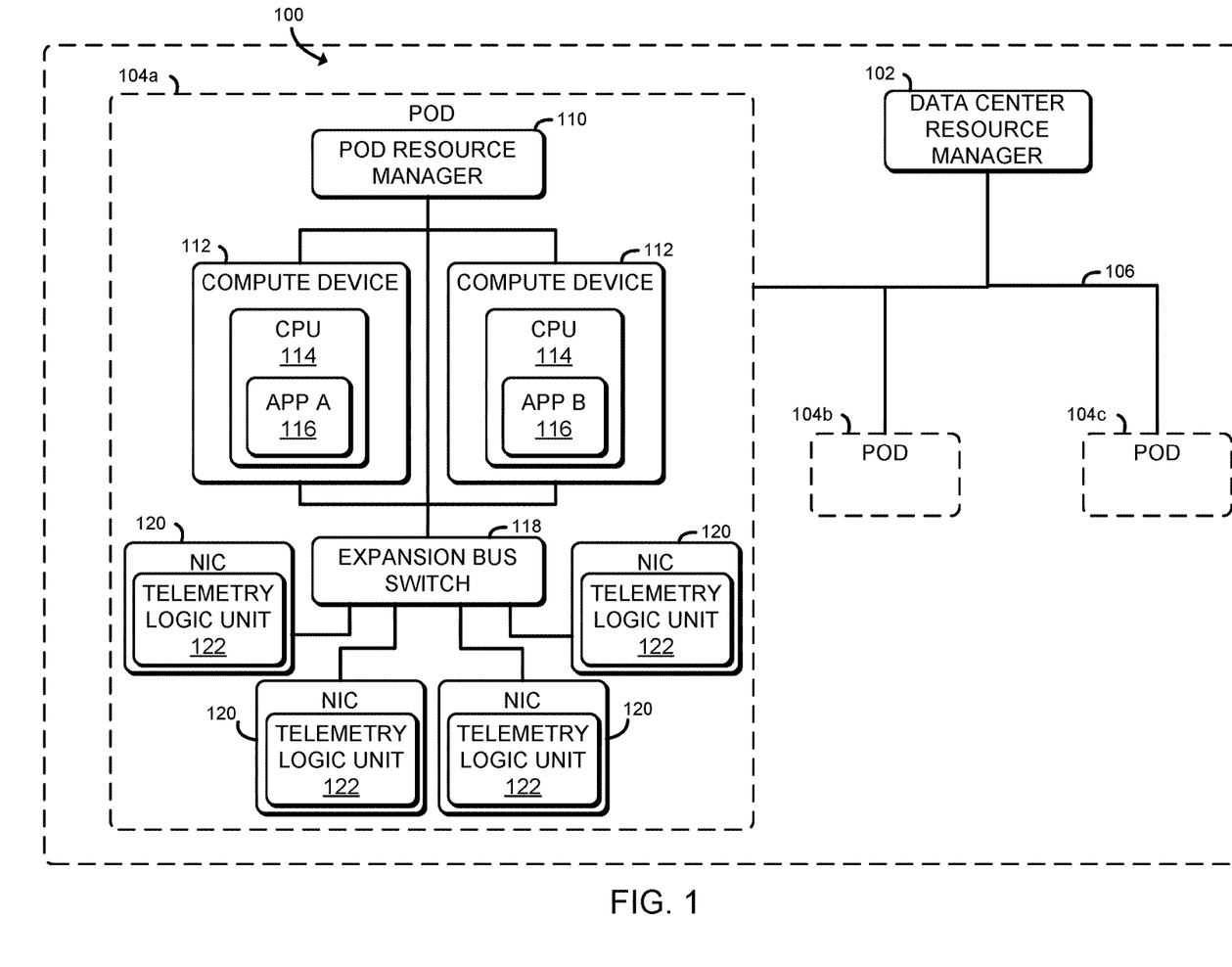
FIG. 1 is a simplified block diagram of at least one embodiment of a system for dynamic allocation of network communication resources.

Referring now to FIG. 1, a system 100 for automatic mapping of disaggregated network communication resources is shown. In the illustrative embodiment, automatic mapping of disaggregated network communication resources may include a data center resource manager 102 allocating network communication resources to compute devices through an expansion bus switch 118 in the system 100. The data center resource manager 102 may be embodied as a resource manager server, described in more detail herein. In the illustrative embodiment, the data center resource manager 102 obtains telemetry data indicative of a present utilization of the allocated set of network communication resources and determine whether the present utilization satisfies a predefined utilization threshold. Accordingly, the data center resource manager 102 adjusts the amount of network communication resources in the set to the compute device in response to a determination that the present utilization does not satisfy the predefined utilization threshold. For example, the data center resource manager 102 may obtain a service level agreement that includes service level agreement data indicative of the predefined utilization threshold to be satisfied in association with a workload executed by the compute device. That is, there are performance requirements executed by the compute device in processing a workload.

In the illustrative embodiment, the system 100 includes the data center resource manager 102 in communication with pods 104a-c through a network 106. Each pod 104a-c includes a pod resource manager 110, one or more compute devices 112, an expansion bus switch 118, and one or more network interface controllers (NICs) 120, which may also be referred to as host fabric interfaces (HFIs) when applied to high speed fabrics, and may be referred to herein as network communication resources. Although only three pods, two compute devices, and four NICs are shown, there may be any number of pods, compute devices, and/or NICs utilized in the system 100. The system 100 may be embodied as a data center and provide storage and compute services (e.g., cloud services) to a client device (not shown) that is in communication with the system 100 through a network 106. In the illustrative embodiment, each compute device 112 utilizes a central processing unit (CPU) 114 to execute a workload 116 (e.g., an application). Additionally, each pod 104a-c includes an expansion bus switch 118, which may be embodied as any device or circuitry (e.g., a Peripheral Component Interconnect Express (PCIe) switch, or a switch based on another data sharing mechanism such as a coherent memory link) capable of allocating network communication resources to the compute devices 112. In other embodiments, one or more of the pods 104a-c, may include other devices or circuitry capable of accelerating the execution of a workload, such as an application-specific integrated circuit, a co-processor, etc. In the illustrative embodiment, the one or more NICs 120 may include a telemetry logic unit 122. The telemetry logic unit 122 may be configured to determine the present utilization of the NICs 120 and determine whether the present utilization satisfies a predefined utilization threshold. The telemetry logic unit 122 may identify when the present utilization exceeds the predefined utilization threshold for a predetermined amount of time (e.g., at least one minute).

In the illustrative embodiment, the network communication resources, embodied as NICs 120, are shared between the compute devices 112. The pod resource manager 110 or the data center resource manager 102 may allocate the NICs 120 to a compute device 112 through the expansion bus switch 118 based on the amount of network communication resources required by the compute device and a service level agreement that defines the target performance of the workload executed by the compute device 112. That is, one or more NICs 120 and/or a portion of one or more NICs 120 may be allocated to the compute devices 112. In operation, the system 100 may utilize one or more NICs 120 to produce telemetry data through the telemetry logic unit 122 indicative of the present utilization of the NICs 120 for use by the data center resource manager 102 or the pod resource manager 110. In some embodiments, the NICs 120 may produce data indicative of a determination of whether the present utilization satisfies the predefined utilization threshold as described above. In some embodiments, the compute devices 112 may produce the telemetry data for the data center resource manager 102 or the pod resource manager 110. The telemetry data provides information on the present utilization of the allocated set of network communication resources. For example, whether a NIC 120 is saturated or underutilized. From this, the pod resource manager 110 or data center resource manager 102 adjusts the amount of network communication resources to the compute device 112 through the expansion bus switch 118. Thereby, the system 100 reduces saturation of the network communication resources (e.g., NICs 120) or underutilization of the network communication resources. In order to adjust the network communication resources accordingly, the pod resource manager 110 or the data center resource manager 102 determines whether the present utilization satisfies a predefined utilization defined by the service level agreement as described above. For example, the pod resource manager 110 compares whether the present utilization is within 40-80% of data communication capacity of the NICs 120 presently allocated to the compute devices 112. In some embodiments, the comparison may be used to determine if the predefined utilization thresholds have been exceeded for a predetermined amount of time as described above. The pod resource manager 110 may adjust the allocation of the NICs 120 to ensure the present utilization meets the predefined thresholds.

Figure 2:
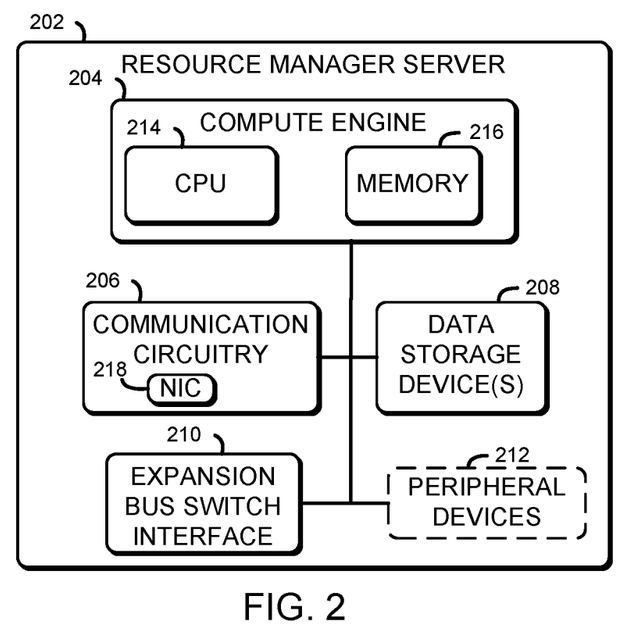
FIG. 2 is a simplified block diagram of at least one embodiment of a resource manager server of the system of FIG. 1.

Referring now to FIG. 2, the data center resource manager 102 or the pod resource manager 110 may be embodied as a resource manager server 202 capable of performing the functions described herein, including allocation of the NICs 120 to the compute devices 112 to perform a workload 116. As shown in FIG. 2, the illustrative resource manager server 202 includes a compute engine 204, a communication circuitry 206, one or more data storage devices 208, and an expansion bus switch interface 210. In some embodiments, the resource manager server 202 may include peripheral devices 212. Of course, in other embodiments, the resource manager server 202 may include other or additional components, such as those commonly found in a server. Additionally, in some embodiments, one or more of the illustrative components may be incorporated in, or otherwise form a portion of, another component.

The compute engine 204 may be embodied as any type of device or collection of devices capable of performing various compute functions described below. In some embodiments, the compute engine 204 may be embodied as a single device such as an integrated circuit, an embedded system, a field-programmable gate array (FPGA), a system-on-a-chip (SOC), or other integrated system or device. Additionally, in some embodiments, the compute engine 204 includes or is embodied as a central processing unit (CPU) 214 and a memory 216. The CPU 214 may be embodied as any type of processor capable of performing the functions described herein. For example, the CPU 214 may be embodied as a single or multi-core processor(s), a microcontroller, or other processor or processing/controlling circuit. In some embodiments, the CPU 214 may be embodied as, include, or be coupled to an FPGA, an application specific integrated circuit (ASIC), reconfigurable hardware or hardware circuitry, or other specialized hardware to facilitate performance of the functions described herein.

The memory 216 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory may comprise a transistor-less stackable cross point architecture in which memory cells sit at the intersection of word lines and bit lines and are individually addressable and in which bit storage is based on a change in bulk resistance. In operation, the memory 216 may store various software and data used during operation such as telemetry data, threshold utilization data, resource allocation data, applications, programs, libraries, and drivers.

The communication circuitry 206 may be embodied as any communication circuit, device, or collection thereof, capable of enabling communications over a network 106 between the pods 104a-c and the data center resource manager 102. The communication circuitry 206 may be configured to use any one or more communication technology (e.g., wired or wireless communications) and associated protocols (e.g., Ethernet, Bluetooth®, Wi-Fi®, WiMAX, etc.) to effect such communication. The NIC 218 may similarly be embodied as any communication circuit, device, or collection thereof, capable of enabling communications over a network 106 between the pods 104a-c and the data center resource manager 102.

The data storage device(s) 208 may be embodied as any type of device or devices configured for short-term or long-term storage of data such as, for example, memory devices and circuits, memory cards, hard disk drives, solid-state drives, non-volatile flash memory, or other data storage devices. The expansion bus switch interface 210 may be embodied as any type of device and/or circuitry configured for communicating with an expansion bus switch (e.g., a Peripheral Component Interconnect Express (PCIe) switch) to connect to the network communication resources of the system 100.

As mentioned above, in some embodiments, the resource manager server 202 may include one or more peripheral devices 212. Such peripheral devices 212 may include any type of peripheral device commonly found in a server and/or compute device such as a display, speakers, a mouse, a keyboard, and/or other input/output devices, interface devices, and/or other peripheral devices.

The pod resource manager 110 may have components similar to those described in FIG. 2. The description of those components of the resource manager server 202 is equally applicable to the description of components of the pod resource manager 110 and is not repeated herein for clarity of the description. Further, it should be appreciated that the pod resource manager 110 may include other components, sub-components, and devices commonly found in a computing device and/or server, which are not discussed above in reference to the resource manager server 202 and not discussed herein for clarity of the description.

Figure 3:
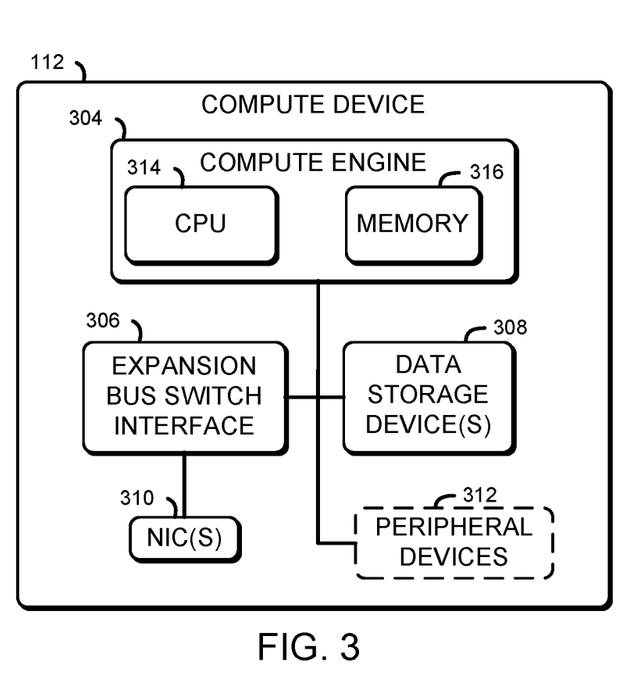
FIG. 3 is a simplified block diagram of at least one embodiment of a compute device of the system of FIG. 1.

Referring now to FIG. 3, the compute device 112, which may have similar components to the resource manager server 202, may be embodied as any type of compute device capable of performing the functions described herein, including executing a workload 116. As shown in FIG. 3, the illustrative compute device 112 includes a compute engine 304, an expansion bus switch interface 306, one or more data storage devices 308, and one or more NICs 310. In some embodiments, the compute device 112 may include peripheral devices 312. Of course, in other embodiments, the compute device 112 may include other or additional components, such as those commonly found in a compute device. Additionally, in some embodiments, one or more of the illustrative components may be incorporated in, or otherwise form a portion of, another component.

The compute engine 304 may be embodied as any type of device or collection of devices capable of performing various compute functions described below. In some embodiments, the compute engine 304 may be embodied as a single device such as an integrated circuit, an embedded system, a field-programmable gate array (FPGA), a system-on-a-chip (SOC), or other integrated system or device. Additionally, in some embodiments, the compute engine 304 includes or is embodied as a central processing unit (CPU) 314 and a memory 316. The CPU 314 may be embodied as any type of processor capable of performing the functions described herein. For example, the CPU 314 may be embodied as a single or multi-core processor(s), a microcontroller, or other processor or processing/controlling circuit. In some embodiments, the CPU 314 may be embodied as, include, or be coupled to an FPGA, an application specific integrated circuit (ASIC), reconfigurable hardware or hardware circuitry, or other specialized hardware to facilitate performance of the functions described herein.

The memory 316 may be embodied as any type of volatile (e.g., dynamic random access memory (DRAM), etc.) or non-volatile memory or data storage capable of performing the functions described herein, similarly to memory 216.

The expansion bus switch interface 306 may be embodied as any type of device and/or circuitry configured for communicating with an expansion bus switch (e.g., a Peripheral Component Interconnect Express (PCIe) switch) to connect to the network communication resources of the system 100.

The data storage device(s) 308 may be embodied as any type of device or devices configured for short-term or long-term storage of data such as, for example, memory devices and circuits, memory cards, hard disk drives, solid-state drives, non-volatile flash memory, or other data storage devices.

The NIC(s) 310 may be embodied as any communication circuit, device, or collection thereof, capable of enabling communications over a network 106 between the data center resource manager 102 and the pods 104a-c. The NIC(s) 310 may be configured to use any one or more communication technology (e.g., wired or wireless communications) and associated protocols (e.g., Ethernet, Bluetooth®, Wi-Fi®, WiMAX, etc.) to effect such communication.

As mentioned above, in some embodiments, the compute device 112 may include one or more peripheral devices 312. Such peripheral devices 312 may include any type of peripheral device commonly found in a compute device such as a display, speakers, a mouse, a keyboard, and/or other input/output devices, interface devices, and/or other peripheral devices.

As described above, the data center resource manager 102 and pods 104a-c are illustratively in communication via a network 106, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 4:
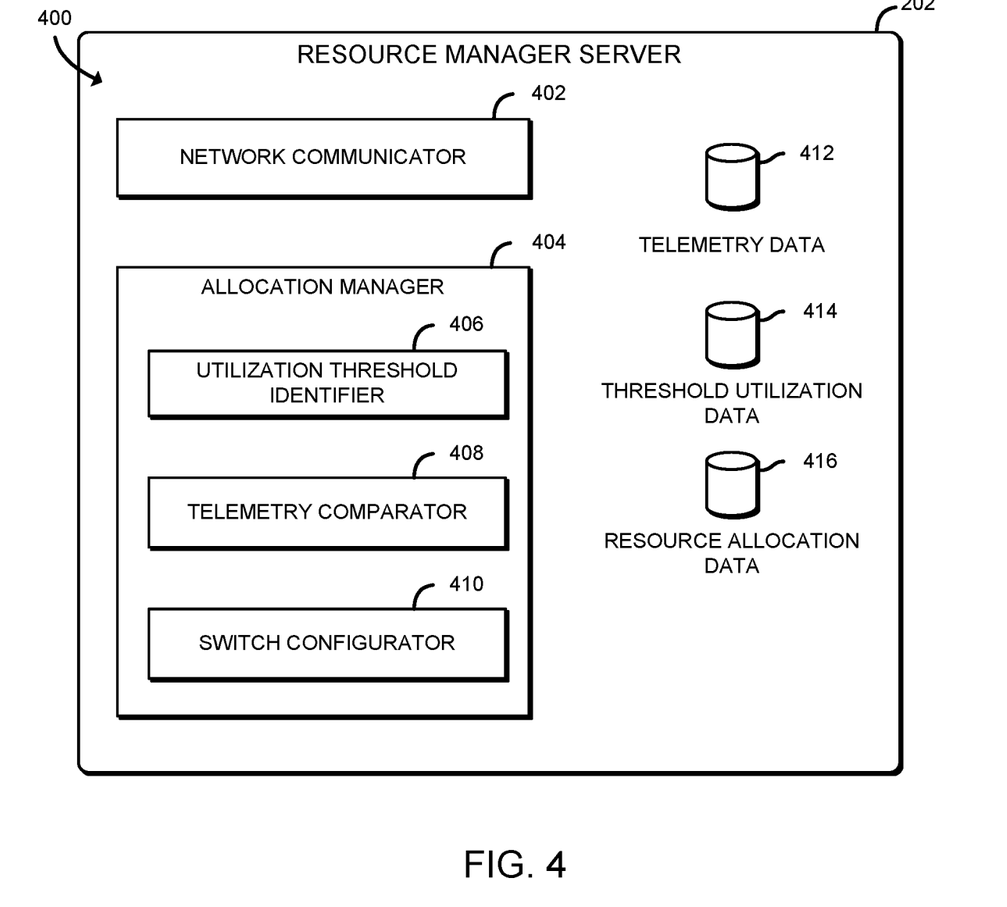
FIG. 4 is a simplified block diagram of at least one embodiment of an environment that may be established by the resource manager server of FIGS. 1 and 2.

Referring now to FIG. 4, the resource manager server 202 may establish an environment 400 during operation. The data center resource manager 102 and the pod resource manager 110 and their components may be similarly embodied as the resource manager server 202 and establish the environment 400 during operation. The illustrative environment 400 includes a network communicator 402 and an allocation manager 404. Each of the components of the environment 400 may be embodied as hardware, firmware, software, or a combination thereof. As such, in some embodiments, one or more of the components of the environment 400 may be embodied as circuitry or a collection of electrical devices (e.g., network communicator circuitry 402, allocation manager circuitry 404, etc.). It should be appreciated that, in such embodiments, one or more of the network communicator circuitry 402 or allocation manager circuitry 404 may form a portion of one or more of the compute engine 204, communication circuitry 206, one or more data storage device(s) 208, expansion bus switch interface 210, and/or any other components of the resource manager server 202. In the illustrative embodiment, the environment 400 includes telemetry data 412, which may be embodied as any data established by the data center resource manager 102 and/or pods 104a-c during the execution of one or more workloads by the compute devices 112 and indicative of the present utilization of network communication resources by the compute devices 112. For example, the present utilization may be indicated as a percentage of the maximum throughput of the network communication resources (e.g. NICs 120), such as 80% of a NIC's 120 capacity. The telemetry data 412 may include alert notifications that utilization thresholds have been exceeded and notifications that utilization thresholds are satisfied. Furthermore, telemetry data 412 may include physical telemetry data (e.g. power utilization, thermal, etc.) and performance data provided by performance monitor agents (PMON). For example, the telemetry logic unit 122 of the NICs 120 may be embodied as or contain the PMON. Additionally, the illustrative environment 400 includes threshold utilization data 414 which may be embodied as any data indicative of the utilization thresholds that define a percentage of the maximum throughput that is allowed for the NICs 120 before an adjustment is made to reduce or increase the utilization of the NICs 120. The thresholds may be defined by a service level agreement as described above. In addition, the illustrative environment 400 includes resource allocation data 416 which may be embodied as any data indicative of the NICs 120 present on each expansion bus switch 118 and the capabilities of each NIC 120 (e.g. max throughput). For example, one NIC 120 may have a bandwidth of 10 gigabytes (GB) and another NIC 120 may have a bandwidth of 40 GB. From this information, the resource allocation data 416 compiles the amount of network communication resources available to be allocated to compute devices 112. Furthermore, the pods 104a-c may communicate with one another to share the network communication resources available to one another.

In the illustrative environment 400, the network communicator 402, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the resource manager server 202, respectively. To do so, the network communicator 402 is configured to receive and process data packets from one system or computing device (e.g., a pods 104a-c and/or data center resource manager 102) and to prepare and send data packets to another computing device or system (e.g., a pods 104a-c and/or data center resource manager 102). Accordingly, in some embodiments, at least a portion of the functionality of the network communicator 402 may be performed by the communication circuitry 206, and, in the illustrative embodiment, by the NIC 218.

The allocation manager 404, which may be embodied as hardware, firmware, software, virtualized hardware, emulated architecture, and/or a combination thereof, is configured to allocate the network communication resources (e.g. NICs 120) to a compute device 112 to perform a workload 116. To do so, in the illustrative embodiment, the allocation manager 404 includes a utilization threshold identifier 406, a telemetry comparator 408, and a switch configurator 410. The utilization threshold identifier 406, in the illustrative environment, is configured to retrieve data from the threshold utilization data 414 in order to determine the predefined threshold to appropriately limit saturation and underutilization of the network communication resources. The utilization threshold identifier 406 may also set the predefined utilization thresholds by determining the predefined utilization thresholds from an input from an administrator or a service level agreement that indicates the desired performance for a compute device 112. For example, a client may require the compute device 112 to perform a workload with relatively low latency and as such yield a lower utilization threshold that needs to be satisfied by not exceeding that threshold. The utilization thresholds may define both a lower end and higher end that need to be satisfied by not exceeding those thresholds. That is, the utilization of the network communication resources must be within a certain range of a percentage of the max throughput.

The telemetry comparator 408, in the illustrative embodiment, is configured to retrieve the telemetry data 412 to determine the present utilization of the network communication resources and compare the present utilization to the utilization thresholds identified by the utilization threshold identifier 406. The telemetry data 412 may also be collected from the NICs 120 and/or the expansion bus switch 118. To do so, the telemetry comparator 408 determines whether the present utilization exceeds the utilization thresholds to determine whether an adjustment of the network communication resources is required or if the present utilization satisfies the utilization thresholds. For example, if the utilization thresholds were set to be between 20-80% and the present utilization is 90%, the telemetry comparator 408 would determine an adjustment is required to reduce the present utilization to within the utilization thresholds.

The switch configurator 410, in the illustrative embodiment, is configured to perform an adjustment of the network communication resources allocated to a compute device 112 by communicating with the expansion bus switch 118 and redirecting one or more NICs 120 or a portion of the one or more NICs 120 to or away from the compute device 112 that is performing the workload 116. The switch configurator 410 may be configured to greatly adjust the present utilization of the set of allocated network communication resources by, for example, allocating more NICs 120 to the compute device 112. In other embodiments, the switch configurator 410 may be configured to slightly reduce the present utilization of the set of allocated network communication resources by, for example, allocating fewer NICs 120 to the compute device 112. In some embodiments, the switch configurator 410 may reallocate the network communication resources to generate a new utilization that is within the utilization thresholds. In addition, in some embodiments, the switch configurator 410 may force utilization of network communication resources to go to zero for maintenance or power efficiency, etc. In the illustrative embodiment, when the switch configurator 410 performs a forced decrease in utilization, the telemetry comparator 408 excludes any network resource utilization data associated with such instances in the determination of whether to adjust the network communication resources.

Figure 5:
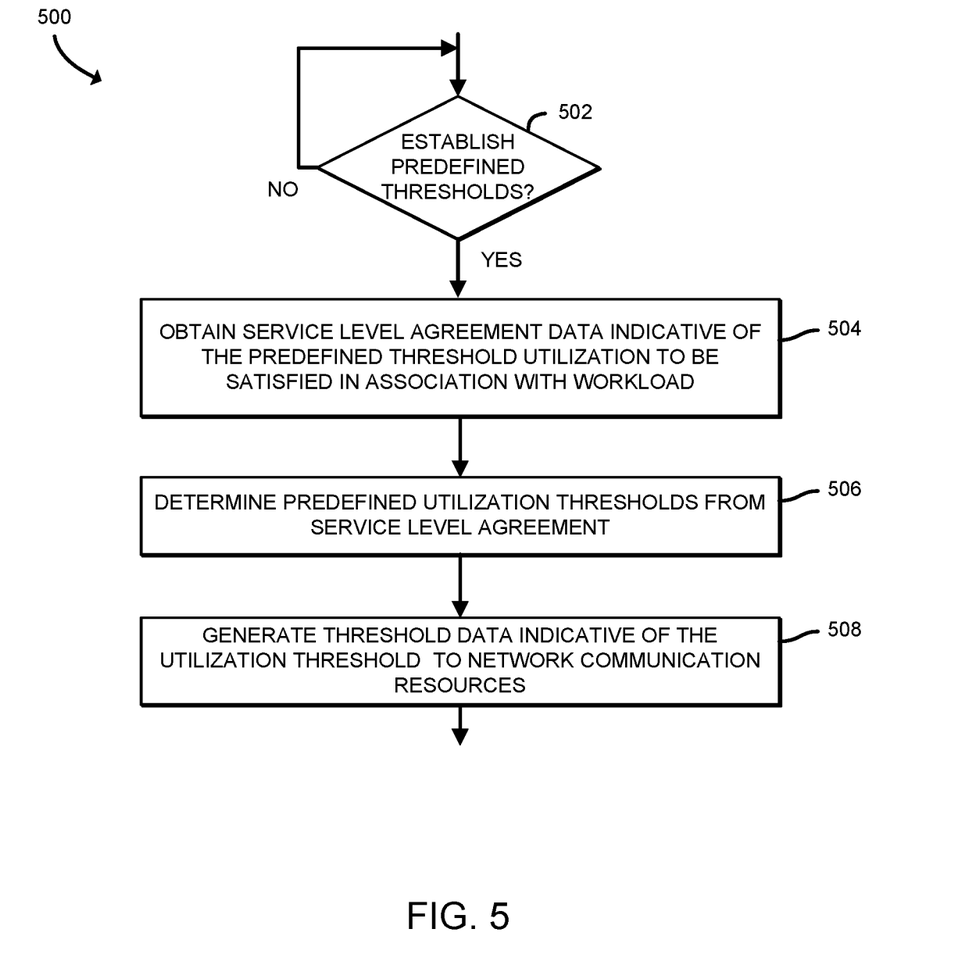
FIG. 5 is a simplified flow diagram of at least one embodiment of a method for establishing predefined utilization thresholds for dynamic allocation of network communication resources that may be performed by the resource manager server of FIGS. 1 and 2.

Referring now to FIG. 5, in use, a resource manager server 202 may execute a method 500 for establishing predefined thresholds for dynamic allocation of network communication resources (e.g. NICs 120) within a system 100 that includes pods 104a-c and data center resource manager 102. For simplicity, the method 500 is described below as being performed by the resource manager server 202. However, it should be understood that in other embodiments, the method 500 may be performed by one or more other devices (e.g. pods 104a-c and/or data center resource manager 102). The method 500 begins with block 502 in which the resource manager server 202 determines whether there is a need to establish predefined utilization thresholds that a compute device 112 performing a workload 116 is required to meet. In the illustrative embodiment, the predefined utilization thresholds establish both a low end utilization threshold and a high end utilization threshold that the compute device 112 may not exceed. This is to avoid underutilization of the network communication resources and saturation of the network communication resources as described above. The establishment of predefined thresholds may include establishing initial utilization thresholds or updating previously-used utilization thresholds. If the resource manager server 202 determines there is a need to establish predefined utilization thresholds, the method 500 advances to block 504. However, if there is no need to establish predefined utilization thresholds, then the method 500 loops back to the start of block 502.

In block 504, the resource manager server 202 obtains a service level agreement that contains service level agreement data indicative of the predefined threshold utilizations to be satisfied in association with a workload 116 executed by a compute device 112. That is, the service level agreement may define a performance requirement for the compute device 112 performing the workload 116, such as whether a particular latency limit is required for performing the workload 116.

In block 506, the resource manager server 202 determines the predefined utilization thresholds from the service level agreement. For example, if a certain amount of bandwidth is required with a low latency, then the resource manager server 202 may set the predefined utilization thresholds to take into account the parameters of the service level agreement.

After determination of the predefined utilization thresholds, the method 500 advances to block 508 in which the resource manager server 202 provides the threshold data indicative of the utilization thresholds to the network communication resources. In some embodiments, the resource manager server 202 may provide the threshold data to the compute devices 112 and/or NICs 120. As a result, the compute devices 112 and/or NICs 120 may analyze the telemetry data indicative of a present utilization and determine whether the present utilization satisfies the predefined utilization thresholds (e.g. are within the thresholds). The NICs 120 may utilize the telemetry logic units 122 in order to perform the determination.

Figure 6:
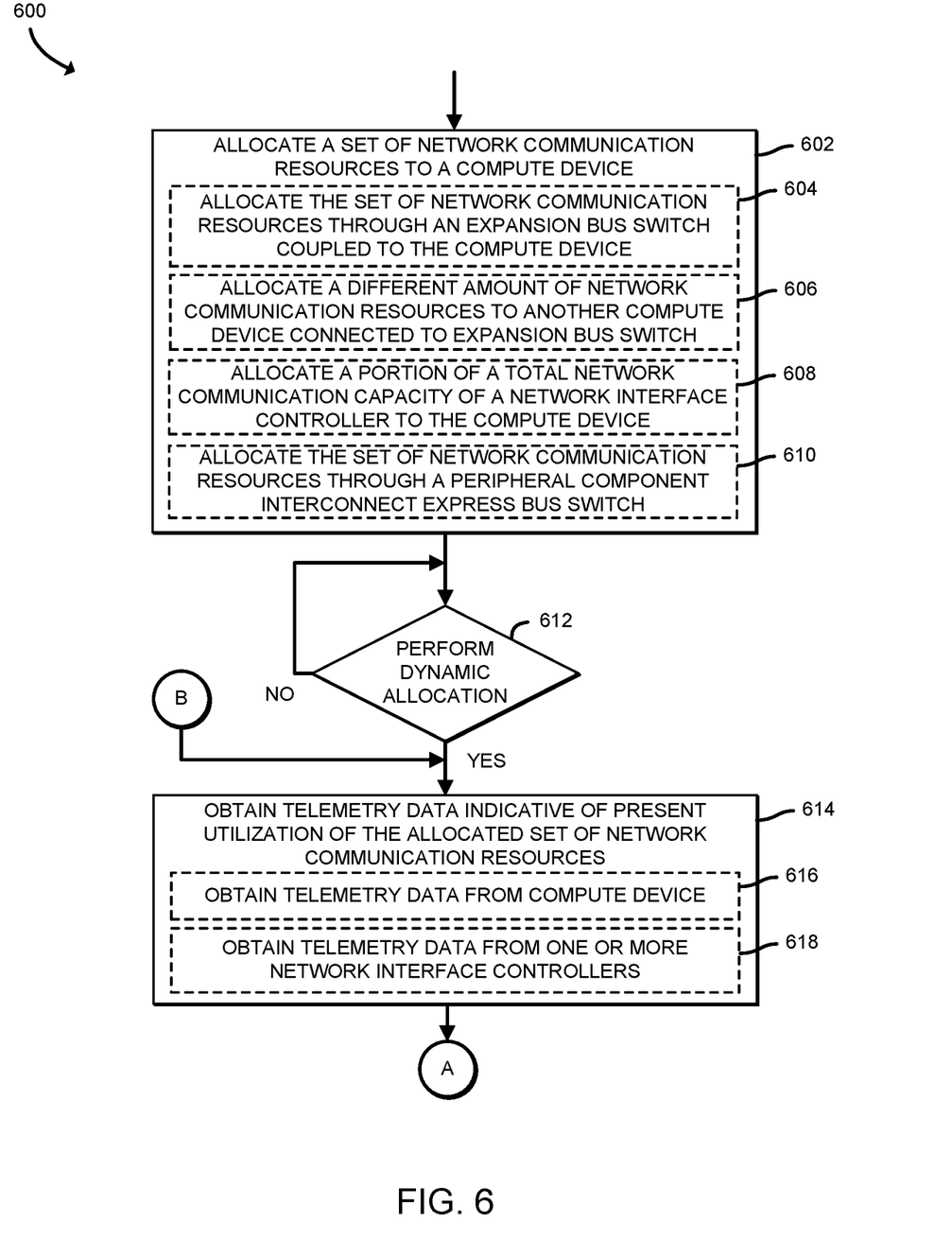
FIGS. 6-7 are a simplified flow diagram of at least one embodiment of a method for dynamic allocation of network communication resources that may be performed by the resource manager server of FIGS. 1 and 2.

Referring now to FIG. 6, in use, a resource manager server 202 may execute a method 600 for dynamic allocation of network communication resources (e.g. NICs 120) within a system 100 that includes pods 104a-c and data center resource manager 102. For simplicity, the method 600 is described below as being performed by the resource manager server 202. However, it should be understood that in other embodiments, the method 600 may be performed by one or more other devices (e.g. pods 104a-c). The method 600 begins with block 602 in which the resource manager server 202 allocates a set of network communication resources, such as NICs 120, to a compute device 112. To do so, in some embodiments, the resource manager server 202 may, in block 604, use an expansion bus switch 118 coupled to the compute device 112 to allocate the set of network communication resources. Furthermore, in some embodiments, in block 606, the resource manager server 202 may allocate a different amount of network communication resources to another compute device 112 connected to the expansion bus switch 118. As such, the resource manager server 202 may allocate network communication resources to a plurality of compute devices 112 connected to the expansion bus switch 118. In some embodiments, the resource manager server 202 may also allocate network communication resources to other computes devices within the system 100. In some embodiments, in block 608, the resource manager server 202 may allocate a portion of a total network communication capacity of a NIC 120 to the compute device 112. For example, if a NIC's 120 total capacity is 40 GB, then the resource manager server 202 may allocate 20 GB of the NIC's 120 total capacity to the compute device 112. In some embodiments, the resource manager server 202 may allocate the set of network communication resources through a peripheral component interconnect express (PCIE) bus switch, as indicated in block 610. In other embodiments, the resource manager server 202 may allocate the set of network communication resources through a coherent memory link.

Subsequent to allocation of the set of network communication resources to the compute device 112, in block 612 the resource manager server 202 determines whether to perform dynamic allocation of the network communication resources. If it is determined that the resource manager server 202 is to perform dynamic allocation of the network communication resources, then the method 600 advances to block 614. However, if there is no need to perform dynamic allocation of the network communication resources (e.g., if a configuration setting indicates to enable dynamic allocation of network communication resources), then the method 600 loops back to the beginning of block 612 to continue monitoring whether dynamic allocation is needed.

In block 614, the resource manager server 202 obtains telemetry data indicative of present utilization of the allocated set of network communication resources. To do so, in some embodiments, in block 616, the resource manager server 202 obtains the telemetry data from the compute device 112. In addition, in some embodiments, in block 618, the resource manager server 202 obtains the telemetry data from one or more NICs 120.

Figure 7:
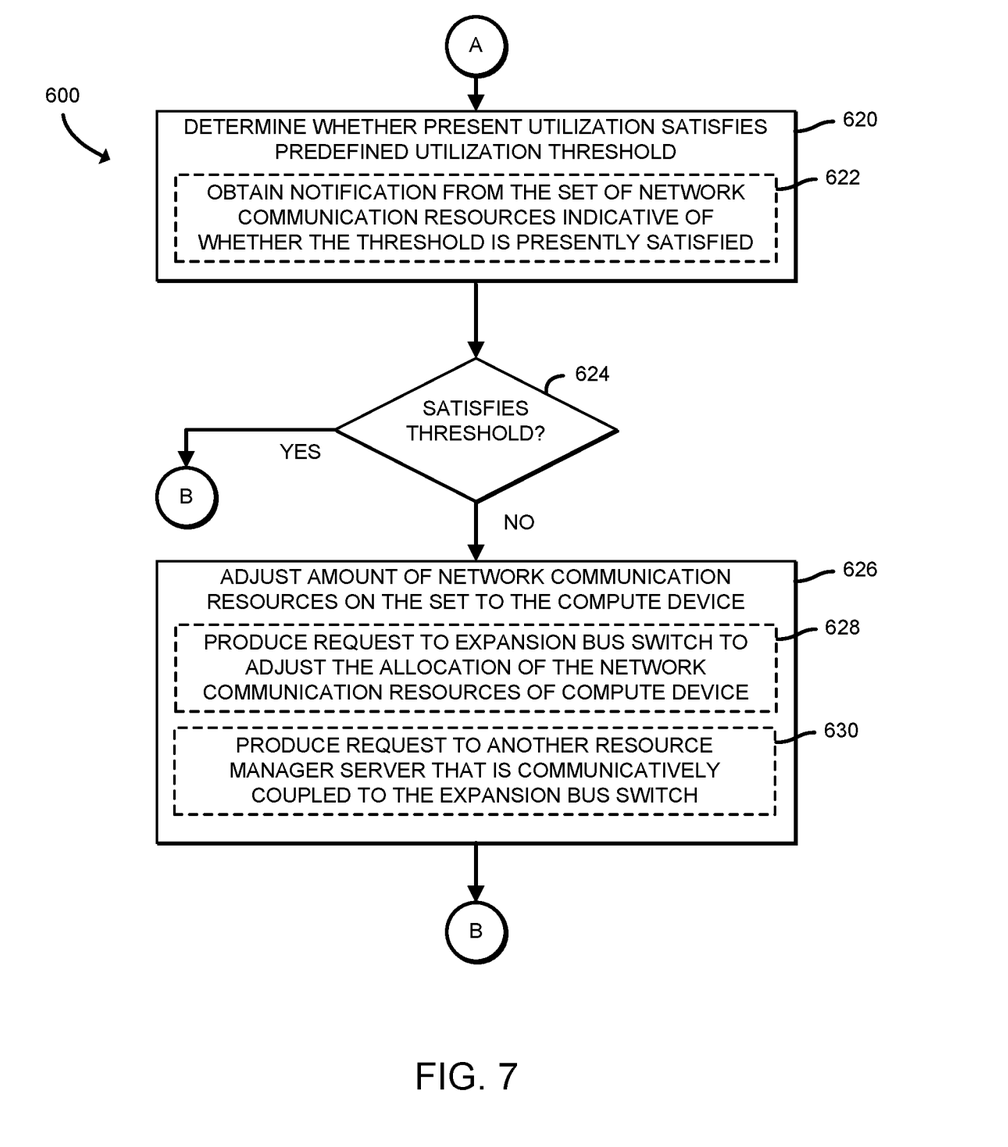

Referring now to FIG. 7, in block 620, the resource manager server 202 determines whether the present utilization satisfies the predefined utilization thresholds. In the illustrative embodiment, the resource manager server 202 may compare the present utilization determined from the telemetry data to the predefined utilization thresholds to determine whether the present utilization is within the predefined utilization thresholds. In some embodiments, in block 622, the resource manager server 202 may obtain a notification from the set of network communication resources indicative of whether a predefined utilization threshold is presently satisfied. That is, the network communication resources may also perform the determination with the threshold data stored on the network communication resources.

In block 624, the resource manager server 202 determines whether the predefined utilization thresholds were satisfied. If the resource manager server 202 determines that the predefined utilization thresholds were satisfied, then the method 600 returns to block 614 of FIG. 6 to continue obtaining telemetry data to monitor the present utilization against the predefined utilization thresholds. However, if the resource manager server 202 determines that one or more predefined utilization thresholds were not met, then the method 600 advances to block 626 in which the resource manager server 202 adjusts the amount of network communication resources to be allocated to the compute device 112. To do so, in some embodiments, in block 628, the resource manager server 202 may produce a request to the expansion bus switch 118 to adjust the allocation of the network communication resources of the compute device 112 associated with the workload for which each predefined network utilization threshold was not satisfied. That is, the resource manager server 202 may allocate more network communication resources or remove some network communication resources to the compute device 112. In addition, in some embodiments, in block 630, the resource manager server 202 may produce a request to another resource manager server that is communicatively coupled to the expansion bus switch 118 to allocate more network communication resources (e.g., if network communication resources from another pod are also connected to the expansion bus switch 118). For example, a pod 104a may communicate with pod 104b to request additional network communication resources to be allocated to the compute device 112. In some embodiments, the resource manager server 202 may adjust a link speed associated with one or more of the network communication resources, adjust a number of links between two devices in the network (e.g., between the compute device 112 and another compute device), and/or adjust traffic shaping parameters. After performing the adjustment, the method 600 returns to block 614 of FIG. 6 to continue obtaining telemetry data to monitor the present utilization against the predefined utilization thresholds.

EXAMPLES

Illustrative examples of the technologies disclosed herein are provided below. An embodiment of the technologies may include any one or more, and any combination of, the examples described below.

Example 1 includes a resource manager server comprising a compute engine to allocate a set of network communication resources to a compute device through an expansion bus switch coupled to the compute device and to the network communication resources; obtain telemetry data indicative of a present utilization of the allocated set of network communication resources; determine whether the present utilization satisfies a predefined utilization threshold; and adjust, through the expansion bus switch and in response to a determination that the present utilization does not satisfy the predefined utilization threshold, an amount of network communication resources in the set to the compute device.

Example 2 includes the subject matter of Example 1, and wherein the compute engine is further to provide threshold data indicative of the utilization threshold to the set of network communication resources, and wherein to determine whether the present utilization satisfies the predefined threshold comprises to obtain a notification from the set of network communication resources indicative of whether the threshold is presently satisfied.

Example 3 includes the subject matter of any of Examples 1 and 2, and wherein the compute engine is further to obtain the determination that the present utilization does not satisfy the predefined utilization threshold from one or more telemetry logic units of one or more network interface controllers coupled to the resource manager server.

Example 4 includes the subject matter of any of Examples 1-3, and wherein the compute engine is further to obtain service level agreement data indicative of the predefined utilization threshold to be satisfied in association with a workload executed by the compute device.

Example 5 includes the subject matter of any of Examples 1-4, and wherein to adjust the amount of network communication resources comprises to produce a request to the expansion bus switch to adjust the allocation of the network communication resources of the compute device.

Example 6 includes the subject matter of any of Examples 1-5, and wherein the network communication resources comprise multiple network interface controllers, and wherein to adjust the amount of network communication resources comprises to increase the number of network interface controllers in the set.

Example 7 includes the subject matter of any of Examples 1-6, and wherein the network communication resources comprise multiple network interface controllers, and wherein to adjust the amount of network communication resources comprises to decrease the number of network interface controllers in the set.

Example 8 includes the subject matter of any of Examples 1-7, and wherein the compute engine is further to allocate a different amount of network communication resources to another compute device connected to the expansion bus switch.

Example 9 includes the subject matter of any of Examples 1-8, and wherein to allocate the set of network communication resources comprises to allocate a portion of a total network communication capacity of a network interface controller to the compute device.

Example 10 includes the subject matter of any of Examples 1-9, and wherein to allocate a set of network communication resources to a compute device through a expansion bus switch comprises to allocate a set of network communication resources to a compute device through a peripheral component interconnect express bus switch.

Example 11 includes the subject matter of any of Examples 1-10, and wherein to obtain the telemetry data comprises to obtain the telemetry data from the compute device.

Example 12 includes the subject matter of any of Examples 1-11, and wherein to obtain the telemetry data comprises to obtain the telemetry data from one or more network interface controllers.

Example 13 includes the subject matter of any of Examples 1-12, and wherein the resource manager server is communicatively coupled to one or more other resource manager servers to cooperatively adjust the amount of network communication resources to be allocated and wherein to adjust the amount of network communication resources comprises to produce a request to a second resource manager server that is communicatively coupled to the switch.

Example 14 includes the subject matter of any of Examples 1-13, and wherein the telemetry data includes physical telemetry data and performance data provided by one or more performance monitor agents, wherein the physical telemetry data includes power utilization data or thermal data.

Example 15 includes a method comprising allocating, by a resource manager server, a set of network communication resources to a compute device through an expansion bus switch coupled to the compute device and to the network communication resources; obtaining, with the resource manager server, telemetry data indicative of a present utilization of the allocated set of network communication resources; determining, with the resource manager server, whether the present utilization satisfies a predefined utilization threshold; and adjusting, with the expansion bus switch and in response to determining that the present utilization does not satisfy the predefined utilization threshold, an amount of network communication resources in the set to the compute device.

Example 16 includes the subject matter of Example 15, and further including providing, with the resource manager server, threshold data indicative of the utilization threshold to the set of network communication resources, and wherein determining whether the present utilization satisfies the predefined threshold comprises obtaining a notification from the set of network communication resources indicative of whether the threshold is presently satisfied.

Example 17 includes the subject matter of any of Examples 15 and 16, and further including obtaining, with the resource manager server, the determination that the present utilization does not satisfy the predefined utilization threshold from one or more telemetry logic units from one or more network interface controllers coupled to the resource manager server.

Example 18 includes the subject matter of any of Examples 15-17, and further including obtaining, with the resource manager server, service level agreement data indicative of the predefined utilization threshold to be satisfied in association with a workload executed by the compute device.

Example 19 includes the subject matter of any of Examples 15-18, and wherein adjusting the amount of network communication resources comprises producing a request to the expansion bus switch to adjust the allocation of the network communication resources of the compute device.

Example 20 includes the subject matter of any of Examples 15-19, and wherein the network communication resources comprise multiple network interface controllers, and wherein adjusting the amount of network communication resources comprises increasing the number of network interface controllers in the set.

Example 21 includes the subject matter of any of Examples 15-20, and wherein the network communication resources comprise multiple network interface controllers, and wherein adjusting the amount of network communication resources comprises decreasing the number of network interface controllers in the set.

Example 22 includes the subject matter of any of Examples 15-21, and further including allocating, with the resource manager server, a different amount of network communication resources to another compute device connected to the expansion bus switch.

Example 23 includes the subject matter of any of Examples 15-22, and wherein allocating the set of network communication resources comprises allocating a portion of a total network communication capacity of a network interface controller to the compute device.

Example 24 includes the subject matter of any of Examples 15-23, and wherein allocating a set of network communication resources to a compute device through a expansion bus switch comprises allocating a set of network communication resources to a compute device through a peripheral component interconnect express bus switch.

Example 25 includes the subject matter of any of Examples 15-24, and wherein obtaining the telemetry data comprises obtaining the telemetry data from the compute device.

Example 26 includes the subject matter of any of Examples 15-25, and wherein obtaining the telemetry data comprises obtaining the telemetry data from one or more network interface controllers.

Example 27 includes the subject matter of any of Examples 15-26, and wherein the resource manager server is communicatively coupled to one or more other resource manager servers to cooperatively adjust the amount of network communication resources to be allocated and wherein adjusting the amount of network communication resources comprises producing a request to a second resource manager server that is communicatively coupled to the expansion bus switch.

Example 28 includes the subject matter of any of Examples 15-27, and wherein the telemetry data includes physical telemetry data and performance data provided by one or more performance monitor agents, wherein the physical telemetry data includes power utilization data or thermal data.

Example 29 includes one or more machine-readable storage media comprising a plurality of instructions stored thereon that, in response to being executed, cause a resource manager server to perform the method of any of Examples 15-28.

Example 30 includes a resource manager server comprising means for performing the method of any of Examples 15-28.

Example 31 includes a resource manager server comprising one or more processors; one or more memory devices having stored therein a plurality of instructions that, when executed by the one or more processors, cause the resource manager server to perform the method of any of Examples 15-28.

Example 32 includes a resource manager server comprising allocation manager circuitry to allocate a set of network communication resources to a compute device through an expansion bus switch coupled to the compute device and to the network communication resources; and network communicator circuitry to obtain telemetry data indicative of a present utilization of the allocated set of network communication resources; wherein the allocation manager circuitry is further to determine whether the present utilization satisfies a predefined utilization threshold; and adjust, through the expansion bus switch and in response to a determination that the present utilization does not satisfy the predefined utilization threshold, an amount of network communication resources in the set to the compute device.

Example 33 includes the subject matter of Example 32, and wherein the allocation manager circuitry is further to provide threshold data indicative of the utilization threshold to the set of network communication resources, and wherein to determine whether the present utilization satisfies the predefined threshold comprises to obtain a notification from the set of network communication resources indicative of whether the threshold is presently satisfied.

Example 34 includes the subject matter of any of Examples 32 and 33, and wherein the allocation manager circuitry is further to obtain the determination that the present utilization does not satisfy the predefined utilization threshold from one or more telemetry logic units of one or more network interface controllers coupled to the resource manager server.

Example 35 includes the subject matter of any of Examples 32-34, and wherein the allocation manager circuitry is further to obtain service level agreement data indicative of the predefined utilization threshold to be satisfied in association with a workload executed by the compute device.

Example 36 includes the subject matter of any of Examples 32-35, and wherein to adjust the amount of network communication resources comprises to produce a request to the expansion bus switch to adjust the allocation of the network communication resources of the compute device.

Example 37 includes the subject matter of any of Examples 32-36, and wherein the network communication resources comprise multiple network interface controllers, and wherein to adjust the amount of network communication resources comprises to increase the number of network interface controllers in the set.

Example 38 includes the subject matter of any of Examples 32-37, and wherein the network communication resources comprise multiple network interface controllers, and wherein to adjust the amount of network communication resources comprises to decrease the number of network interface controllers in the set.

Example 39 includes the subject matter of any of Examples 32-38, and wherein the allocation manager circuitry is further to allocate a different amount of network communication resources to another compute device connected to the expansion bus switch.

Example 40 includes the subject matter of any of Examples 32-39, and wherein to allocate the set of network communication resources comprises to allocate a portion of a total network communication capacity of a network interface controller to the compute device.

Example 41 includes the subject matter of any of Examples 32-40, and wherein to allocate a set of network communication resources to a compute device through a expansion bus switch comprises to allocate a set of network communication resources to a compute device through a peripheral component interconnect express bus switch.

Example 42 includes the subject matter of any of Examples 32-41, and wherein to obtain the telemetry data comprises to obtain the telemetry data from the compute device.

Example 43 includes the subject matter of any of Examples 32-42, and wherein to obtain the telemetry data comprises to obtain the telemetry data from one or more network interface controllers.

Example 44 includes the subject matter of any of Examples 32-43, and wherein the resource manager server is communicatively coupled to one or more other resource manager servers to cooperatively adjust the amount of network communication resources to be allocated and wherein to adjust the amount of network communication resources comprises to produce a request to a second resource manager server that is communicatively coupled to the switch.

Example 45 includes the subject matter of any of Examples 32-44, and wherein the telemetry data includes physical telemetry data and performance data provided by one or more performance monitor agents, wherein the physical telemetry data includes power utilization data or thermal data.

Example 46 includes a resource manager server comprising circuitry for allocating a set of network communication resources to a compute device through an expansion bus switch coupled to the compute device and to the network communication resources; circuitry for obtaining telemetry data indicative of a present utilization of the allocated set of network communication resources; circuitry for determining whether the present utilization satisfies a predefined utilization threshold; and means for adjusting, with the expansion bus switch and in response to determining that the present utilization does not satisfy the predefined utilization threshold, an amount of network communication resources in the set to the compute device.

Example 47 includes the subject matter of Example 46, and further including circuitry for providing threshold data indicative of the utilization threshold to the set of network communication resources, and wherein the circuitry for determining whether the present utilization satisfies the predefined threshold comprises circuitry for obtaining a notification from the set of network communication resources indicative of whether the threshold is presently satisfied.

Example 48 includes the subject matter of any of Examples 46 and 47, and further including circuitry for obtaining the determination that the present utilization does not satisfy the predefined utilization threshold from one or more telemetry logic units from one or more network interface controllers coupled to the resource manager server.

Example 49 includes the subject matter of any of Examples 46-48, and further including circuitry for obtaining service level agreement data indicative of the predefined utilization threshold to be satisfied in association with a workload executed by the compute device.

Example 50 includes the subject matter of any of Examples 46-49, and wherein the means for adjusting the amount of network communication resources comprises circuitry for producing a request to the expansion bus switch to adjust the allocation of the network communication resources of the compute device.

Example 51 includes the subject matter of any of Examples 46-50, and wherein the network communication resources comprise multiple network interface controllers, and wherein the means for adjusting the amount of network communication resources comprises circuitry for increasing the number of network interface controllers in the set.

Example 52 includes the subject matter of any of Examples 46-51, and wherein the network communication resources comprise multiple network interface controllers, and wherein the means for adjusting the amount of network communication resources comprises circuitry for decreasing the number of network interface controllers in the set.

Example 53 includes the subject matter of any of Examples 46-52, and further including circuitry for allocating a different amount of network communication resources to another compute device connected to the expansion bus switch.

Example 54 includes the subject matter of any of Examples 46-53, and wherein the circuitry for allocating the set of network communication resources comprises circuitry for allocating a portion of a total network communication capacity of a network interface controller to the compute device.

Example 55 includes the subject matter of any of Examples 46-54, and wherein the circuitry for allocating a set of network communication resources to a compute device through a expansion bus switch comprises circuitry for allocating a set of network communication resources to a compute device through a peripheral component interconnect express bus switch.

Example 56 includes the subject matter of any of Examples 46-55, and wherein the circuitry for obtaining the telemetry data comprises circuitry for obtaining the telemetry data from the compute device.

Example 57 includes the subject matter of any of Examples 46-56, and wherein the circuitry for obtaining the telemetry data comprises circuitry for obtaining the telemetry data from one or more network interface controllers.

Example 58 includes the subject matter of any of Examples 46-57, and wherein the resource manager server is communicatively coupled to one or more other resource manager servers to cooperatively adjust the amount of network communication resources to be allocated and wherein the means for adjusting the amount of network communication resources comprises circuitry for producing a request to a second resource manager server that is communicatively coupled to the expansion bus switch.

Example 59 includes the subject matter of any of Examples 46-58, and wherein the telemetry data includes physical telemetry data and performance data provided by one or more performance monitor agents, wherein the physical telemetry data includes power utilization data or thermal data.

Example 60 includes a resource manager server comprising a compute engine to allocate a set of network communication resources to a compute device; obtain telemetry data indicative of a present utilization of the allocated set of network communication resources; determine whether the present utilization satisfies a predefined utilization threshold; and adjust, in response to a determination that the present utilization does not satisfy the predefined utilization threshold, an amount of network communication resources in the set to the compute device.

Example 61 includes the subject matter of Example 60, and wherein to adjust the amount of network communication resources comprises to adjust a number of network links to or from the compute device.

Example 62 includes the subject matter of any of Examples 60 and 61, and wherein to adjust the amount of network communication resources comprises to adjust a speed of one or more network links provided by the network communication resources.

Example 63 includes the subject matter of any of Examples 60-62, and wherein to adjust the amount of network communication resources comprises to adjust a traffic shaping parameter associated with the network communication resources.

Example 64 includes a method comprising allocating, by a resource manager server, a set of network communication resources to a compute device; obtaining, by the resource manager server, telemetry data indicative of a present utilization of the allocated set of network communication resources; determining, by the resource manager server, whether the present utilization satisfies a predefined utilization threshold; and adjusting, by the resource manager server and in response to a determination that the present utilization does not satisfy the predefined utilization threshold, an amount of network communication resources in the set to the compute device.

Example 65 includes the subject matter of Example 64, and wherein adjusting the amount of network communication resources comprises adjusting a number of network links to or from the compute device.

Example 66 includes the subject matter of any of Examples 64 and 65, and wherein adjusting the amount of network communication resources comprises adjusting a speed of one or more network links provided by the network communication resources.

Example 67 includes the subject matter of any of Examples 64-66, and wherein adjusting the amount of network communication resources comprises adjusting a traffic shaping parameter associated with the network communication resources.

Example 68 includes one or more machine-readable storage media comprising a plurality of instructions stored thereon that, in response to being executed, cause a resource manager server to perform the method of any of Examples 64-67.

Example 69 includes a resource manager server comprising means for performing the method of any of Examples 64-67.

Example 70 includes a resource manager server comprising one or more processors; one or more memory devices having stored therein a plurality of instructions that, when executed by the one or more processors, cause the resource manager server to perform the method of any of Examples 64-67.

Example 71 includes a resource manager server comprising allocation manager circuitry to allocate a set of network communication resources to a compute device; and network communicator circuitry to obtain telemetry data indicative of a present utilization of the allocated set of network communication resources; wherein the allocation manager circuitry is further to determine whether the present utilization satisfies a predefined utilization threshold; and adjust, in response to a determination that the present utilization does not satisfy the predefined utilization threshold, an amount of network communication resources in the set to the compute device.

Example 72 includes the subject matter of Example 71, and wherein to adjust the amount of network communication resources comprises to adjust a number of network links to or from the compute device.

Example 73 includes the subject matter of any of Examples 71 and 72, and wherein to adjust the amount of network communication resources comprises to adjust a speed of one or more network links provided by the network communication resources.

Example 74 includes the subject matter of any of Examples 71-73, and wherein to adjust the amount of network communication resources comprises to adjust a traffic shaping parameter associated with the network communication resources.

Example 75 includes a resource manager server comprising circuitry for allocating a set of network communication resources to a compute device; circuitry for obtaining telemetry data indicative of a present utilization of the allocated set of network communication resources; circuitry for determining whether the present utilization satisfies a predefined utilization threshold; and means for adjusting, in response to a determination that the present utilization does not satisfy the predefined utilization threshold, an amount of network communication resources in the set to the compute device.

Example 76 includes the subject matter of Example 75, and wherein the means for adjusting the amount of network communication resources comprises circuitry for adjusting a number of network links to or from the compute device.

Example 77 includes the subject matter of any of Examples 75 and 76, and wherein the means for adjusting the amount of network communication resources comprises circuitry for adjusting a speed of one or more network links provided by the network communication resources.

Example 78 includes the subject matter of any of Examples 75-77, and wherein the means for adjusting the amount of network communication resources comprises circuitry for adjusting a traffic shaping parameter associated with the network communication resources.

The invention claimed is:

1. A resource manager server comprising:
a processor circuit to:
allocate a portion of network communication resources from a collection of network communication resources to a compute device that hosts circuitry to execute a workload, the collection of network communication resources separately coupled with each other through a coherent memory link switch, each network communication resource in the collection of network communication resources capable of separately coupling with the compute device through the coherent memory link switch;
obtain telemetry data indicative of a utilization of the allocated portion of network communication resources while the circuitry executes the workload; and
adjust, through the coherent memory link switch, an amount of network communication resources included in the allocated portion of network communication resources based on the utilization of the allocated portion indicated in the obtained telemetry data.

2. The resource manager server of claim 1, further comprising the processor circuit to:
provide threshold data indicative of a utilization threshold to the allocated portion of network communication resources, and wherein to adjust the amount of network communication resources is based on the obtained telemetry data including at least one notification from the allocated portion of network communication resources indicative of whether the utilization threshold is presently satisfied.

3. The resource manager server of claim 2, comprising the at least one notification indicates that the utilization does not satisfy the utilization threshold, wherein the at least one notification was generated by one or more telemetry logic units of one or more network interface controllers included in the allocated portion of network communication resources.

4. The resource manager server of claim 2, wherein the processor circuit is further to obtain service level agreement data indicative of the utilization threshold to be satisfied while the circuitry hosted by the compute device executes the workload.

5. The resource manager server of claim 1, wherein to adjust the amount of network communication resources comprises to produce a request to the coherent memory link switch to adjust the allocated portion of network communication resources allocated to the compute device.

6. The resource manager server of claim 1, the collection of network communication resources includes multiple network interface controllers, wherein to adjust the amount of network communication resources included in the allocated portion of network communication resources comprises to increase a number of network interface controllers in the allocated portion.

7. The resource manager server of claim 1, the collection of network communication resources includes multiple network interface controllers, wherein to adjust the amount of network communication resources included in the allocated portion of network communication resources comprises to decrease a number of network interface controllers in the allocated portion.

8. The resource manager server of claim 7, wherein the processor circuit is further to reallocate the decreased number of network interface controllers previously allocated to the compute device to a second compute device, each network communication resource in the collection of network communication resources also capable of separately coupling with the second compute device through the coherent memory link switch, the second compute device to host second circuitry to execute a second workload.

9. The resource manager server of claim 1, wherein the processor circuit is further to allocate a second portion of network communication resources from the collection of network communication resources to a second compute device, each network communication resource in the collection of network communication resources also capable of separately coupling with the second compute device through the coherent memory link switch, the second compute device to host second circuitry to execute a second workload.

10. The resource manager server of claim 1, wherein to allocate the portion of network communication resources from the collection of network communication resources comprises to allocate a first portion of a total network communication capacity of a network interface controller included in the collection of network communication resources to the compute device.

11. The resource manager server of claim 1, the coherent memory link switch comprises a peripheral component interconnect express bus switch.

12. The resource manager server of claim 1, wherein to obtain the telemetry data comprises to obtain the telemetry data from the compute device.

13. The resource manager server of claim 1, wherein to obtain the telemetry data comprises to obtain the telemetry data from one or more network interface controllers included in the allocated portion of network communication resources.

14. The resource manager server of claim 1, wherein the resource manager server is communicatively coupled with one or more other resource manager servers to cooperatively adjust the amount of network communication resources of the collection of network communication resources to be separately allocated to a plurality of compute devices and wherein to adjust the amount of network communication resources included in the portion allocated to the compute device comprises the processor circuit to produce a request to a second resource manager server that is communicatively coupled with the coherent memory link switch, the request to indicate a need to adjust the amount of network communication resources include in the portion allocated to the compute device.

15. The resource manager server of claim 1, wherein the telemetry data includes physical telemetry data and performance data provided by one or more performance monitor agents, wherein the physical telemetry data includes power utilization data or thermal data.

16. One or more non-transitory machine-readable storage media comprising a plurality of instructions stored thereon that, in response to being executed, cause a resource manager server to:
 allocate a portion of network communication resources from a collection of network communication resources to a compute device that hosts circuitry to execute a workload, the collection of network communication resources separately coupled with each other through a coherent memory link switch, each network communication resource in the collection of network communication resources capable of separately coupling with the compute device through the coherent memory link switch;
 obtain telemetry data indicative of a utilization of the allocated portion of network communication resources while the circuitry executes the workload;
 and
 adjust, through the coherent memory link switch, an amount of network communication resources included in the allocated portion of network communication resources based on the utilization of the allocated portion indicated in the obtained telemetry data.

17. The one or more non-transitory machine-readable storage media of claim 16, wherein the plurality of instructions, when executed, further cause the resource manager server to:
 provide threshold data indicative of a utilization threshold to the allocated portion of network communication resources, and wherein to adjust the amount of network communication resources is based on the obtained telemetry data including at least one notification from the allocated portion of network communication resources indicative of whether the utilization threshold is presently satisfied.

18. The one or more non-transitory machine-readable storage media of claim 17, comprising the at least one notification indicates that the utilization does not satisfy the utilization threshold, wherein the at least one notification was generated by one or more telemetry logic units of one or more network interface controllers included in the allocated portion of network communication resources.

19. The one or more non-transitory machine-readable storage media of claim 17, wherein the plurality of instructions, when executed, further cause the resource manager server to obtain service level agreement data indicative of the utilization threshold to be satisfied while the circuitry hosted by the compute device executes the workload.

20. The one or more non-transitory machine-readable storage media of claim 16, wherein to adjust the amount of network communication resources comprises to produce a request to the coherent memory link switch to adjust the allocated portion of network communication resources allocated to the compute device.

21. The one or more non-transitory machine-readable storage media of claim 16, the collection of network communication resources includes multiple network interface controllers, wherein to adjust the amount of network communication resources included in the allocated portion of network communication resources comprises to increase a number of network interface controllers in the allocated portion.

22. The one or more non-transitory machine-readable storage media of claim 16, wherein the collection of network communication resources includes multiple network interface controllers, and wherein to adjust the amount of network communication resources included in the allocated portion of network communication resources comprises to decrease a number of network interface controllers in the allocated portion.

23. The one or more non-transitory machine-readable storage media of claim 22, the plurality of instructions to further cause the resource manager server to reallocate the decreased number of network interface controllers previously allocated to the compute device to a second compute device, each network communication resource in the collection of network communication resources also capable of separately coupling with the second compute device through the coherent memory link switch, the second compute device to host second circuitry to execute a second workload.

24. The one or more non-transitory machine-readable storage media of claim 16, wherein the plurality of instructions, when executed, further cause the resource manager server to allocate a second portion of network communication resources from the collection of network communication resources to a second compute device, each network communication resource in the collection of network communication resources also capable of separately coupling with the second compute device through the coherent memory link switch, the second compute device to host second circuitry to execute a second workload.

25. The one or more non-transitory machine-readable storage media of claim 16, wherein to allocate the portion of network communication resources from the collection of network communication resources comprises to allocate a first portion of a total network communication capacity of a network interface controller included in the collection of network communication resources to the compute device.

26. The one or more non-transitory machine-readable storage media of claim 16, the coherent memory link switch comprises a peripheral component interconnect express bus switch.

27. A method comprising:
 allocating a portion of network communication resources from a collection of network communication resources to a compute device that hosts circuitry to execute a workload, the collection of network communication resources separately coupled with each other through a coherent memory link switch, each network communication resource in the collection of network communication resources capable of separately coupling with the compute device through the coherent memory link switch;
 obtaining telemetry data indicative of a utilization of the allocated portion of network communication resources while the circuitry executes the workload; and adjusting, through the coherent memory link switch, an amount of network communication resources included in the allocated portion of network communication resources based on the utilization of the allocated portion indicated in the obtained telemetry data.

28. The method of claim 27, further comprising:
providing threshold data indicative of a utilization threshold to the allocated portion of network communication resources, and
wherein adjusting the amount of network communication resources is based on the obtained telemetry data including at least one notification from the allocated portion of network communication resources indicative of whether the utilization threshold is presently satisfied.

29. The method of claim 28, comprising the at least one notification indicates that utilization does not satisfy the utilization threshold, wherein the at least one notification was generated by one or more telemetry logic units of one or more network interface controllers included in the allocated portion of network communication resources.

30. One or more non-transitory machine-readable storage media comprising a plurality of instructions stored thereon that, in response to being executed, cause a system to:
allocate one or more network interface controllers (NICs) to a compute device that hosts circuitry to execute a workload, the one or more NICs included in a collection of NICs located remote to the compute device, the collection of NICs to be separately coupled with each other through a coherent memory link switch, each NIC in the collection of NICs also capable of separately coupling with the compute device through the coherent memory link switch; and
obtain telemetry data that indicates a utilization of the allocated one or more NICs while the circuitry executes the workload; and
adjust, through the coherent memory link switch, a number of NICs included in the allocated one or more NICs based on the utilization indicated in the obtained telemetry data.

31. The one or more non-transitory machine-readable storage media of claim 30, wherein the plurality of instructions, when executed, further cause the system to:
provide threshold data indicative of a utilization threshold to the allocated one or more NICs, and wherein to adjust the number of NICs is based on the obtained telemetry data including at least one notification from the allocated one or more NICs indicative of whether the utilization threshold is presently satisfied.

32. The one or more non-transitory machine-readable storage media of claim 30, the coherent memory link switch comprises a peripheral component interconnect express bus switch.

33. The one or more non-transitory machine-readable storage media of claim 30, wherein to adjust the number of NICs included in the allocated one or more NICs comprises to decrease the number of NICs included in the allocated one or more NICs.

34. The one or more non-transitory machine-readable storage media of claim 33, the plurality of instructions to further cause the system to reallocate the decreased number of NICs previously allocated to the compute device to a second compute device, each NIC in the collection of NICs also capable of separately coupling with the second compute device through the coherent memory link switch, the second compute device to host second circuitry to execute a second workload, wherein the collection of NICs is located remote to the second compute device.

* * * * *